US012656617B2

(12) United States Patent
Liu et al.

(10) Patent No.: US 12,656,617 B2
(45) Date of Patent: Jun. 16, 2026

(54) HEAD-MOUNTED DISPLAY DEVICE

(71) Applicants: Beijing BOE Optoelectronics Technology Co., Ltd., Beijing (CN); BOE Technology Group Co., Ltd., Beijing (CN)

(72) Inventors: Yuhong Liu, Beijing (CN); Jinbao Peng, Beijing (CN); Feng Zi, Beijing (CN); Zhanshan Ma, Beijing (CN); Lili Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 340 days.

(21) Appl. No.: 18/281,305

(22) PCT Filed: Jul. 6, 2022

(86) PCT No.: PCT/CN2022/104083
§ 371 (c)(1),
(2) Date: Sep. 10, 2023

(87) PCT Pub. No.: WO2023/284604
PCT Pub. Date: Jan. 19, 2023

(65) Prior Publication Data
US 2024/0151980 A1 May 9, 2024

(30) Foreign Application Priority Data

Jul. 13, 2021 (CN) .......................... 202110791897.4

(51) Int. Cl.
*G02B 27/01* (2006.01)
(52) U.S. Cl.
CPC .. *G02B 27/0176* (2013.01); *G02B 2027/0159* (2013.01)

(58) Field of Classification Search
CPC G02B 27/0176; G02B 27/01; G02B 27/0172; G02B 2027/0159; G02B 2027/0178; G02B 7/02; G02B 7/023
(Continued)

(56) References Cited

U.S. PATENT DOCUMENTS 10,085,004 B2 * 9/2018 Tempel ................ H04N 13/344
10,848,751 B2 * 11/2020 Miller .................. H04N 13/332
(Continued)

FOREIGN PATENT DOCUMENTS

CN 106094209 A 11/2016
CN 107340598 A 11/2017
(Continued)

OTHER PUBLICATIONS

International Search Report for PCT/CN2022/104083 Mailed Oct. 11, 2022.
(Continued)

*Primary Examiner* — William R Alexander
(74) *Attorney, Agent, or Firm* — Ling Wu; Stephen Yang; Ling and Yang Intellectual Property

(57) ABSTRACT

A head-mounted display device, comprising a holder, a lens barrel assembly provided on the holder, and an adjusting device. The lens barrel assembly comprises a lens barrel, a display module provided in the lens barrel, and an optical lens group provided at one end of the lens barrel, wherein the optical lens group comprises at least one optical lens. The adjusting device comprises a driving device provided on the holder, a support provided in the lens barrel and fixedly connected to the display module, and a transmission device. The transmission device is configured to be capable of driving the support to do a reciprocating linear motion under a driving of the driving device, so that the display module is close to or away from the optical lens group.

19 Claims, 4 Drawing Sheets

(58) Field of Classification Search
    USPC ........................................................ 359/462
    See application file for complete search history.

(56)                    References Cited

U.S. PATENT DOCUMENTS

| 11,099,385 | B2 * | 8/2021 | Zhou ...................... G02C 7/081 |
|---|---|---|---|
| 2016/0320612 | A1 * | 11/2016 | Zhang ................... G02B 27/017 |
| 2016/0366399 | A1 * | 12/2016 | Tempel ................ H04N 13/344 |
| 2018/0338130 | A1 * | 11/2018 | Miller .................. H04N 13/327 |
| 2019/0302394 | A1 | 10/2019 | Zhou et al. |
| 2020/0124852 | A1 * | 4/2020 | Zhou ...................... G02C 7/081 |
| 2021/0405396 | A1 * | 12/2021 | Ma ............................ G02C 9/02 |
| 2023/0048475 | A1 * | 2/2023 | Liu ................... G02B 27/0179 |

FOREIGN PATENT DOCUMENTS

| CN | 207924627 U | 9/2018 |
|---|---|---|
| CN | 110501815 A | 11/2019 |
| CN | 112180609 A | 1/2021 |
| CN | 212905720 U | 4/2021 |

OTHER PUBLICATIONS

Office Action dated Apr. 10, 2025 for CN 202110791897.4 and English Translation.

* cited by examiner

HEAD-MOUNTED DISPLAY DEVICE

CROSS-REFERENCE TO RELATED APPLICATIONS

The present application is a U.S. National Phase Entry of International Application PCT/CN2022/104083 having an international filing date of Jul. 6, 2022, which claims priority of Chinese patent application No. 202110791897.4, entitled "Head-mounted display device", filed to the CNIPA on Jul. 13, 2021, the contents of the above-identified applications should be interpreted as being incorporated into the present application by reference.

TECHNICAL FIELD

Embodiments of the present disclosure relate to, but are not limited to, the field of display technologies, and particularly to a head-mounted display device.

BACKGROUND

In some AR (Augmented Reality) glasses, a distance from a screen to optical lens (object distance) is basically fixed, so an image distance is fixed when a user wears AR glasses. When the user is nearsighted, it can cause a content presented by the AR glasses to be unclear. At present, most methods are to place adaptive myopia lenses in front of the AR glasses. However, this gives people a feeling of wearing two glasses, and also increases a bulky appearance and structure of the AR glasses.

SUMMARY

The following is a summary of subject matter described herein in detail. The summary is not intended to limit the protection scope of claims.

An embodiment of the present disclosure provides a head-mounted display device, which includes a holder, a lens barrel assembly provided on the holder and an adjusting device; the lens barrel assembly includes a lens barrel, a display module provided in the lens barrel and an optical lens group provided at one end of the lens barrel, wherein the optical lens group includes at least one optical lens; the adjusting device includes a driving device provided on the holder, a support provided in the lens barrel and fixedly connected with the display module, and a transmission device. The driving device drives the transmission device to move to drive the support to perform a reciprocating linear motion, so that the display module is moved close to or away from the optical lens group.

Other aspects may be understood upon reading and understanding the drawings and detailed description.

BRIEF DESCRIPTION OF DRAWINGS

The drawings are intended to provide a further understanding of technical solutions of the present disclosure and form a part of the specification, and are used to explain the technical solutions of the present disclosure together with embodiments of the present disclosure, and do not form limitations on the technical solutions of the present disclosure. Shapes and sizes of components in the drawings do not reflect actual scales, and are only intended to schematically illustrate contents of the present disclosure.

DETAILED DESCRIPTION

Those of ordinary skills in the art should understand that modifications or equivalent replacements may be made to the technical solutions of an embodiment of the present disclosure without departing from the spirit and scope of the technical solutions of an embodiment of the present disclosure, and should all fall in the scope of the claims of the present disclosure.

Figure 1:
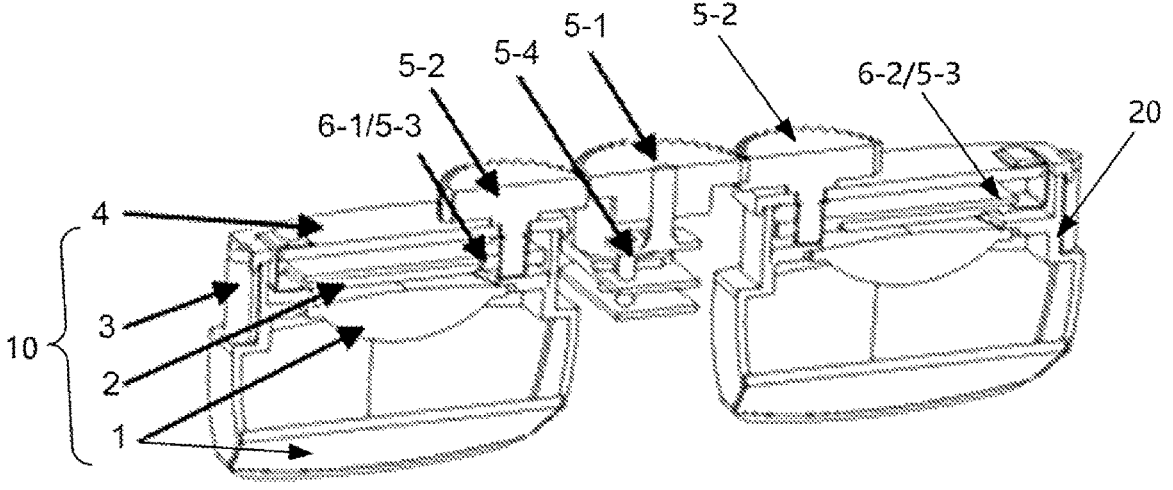
FIG. 1 is schematic view of a cross-sectional structure of a head-mounted display device according to some exemplary embodiments.
Figure 2:
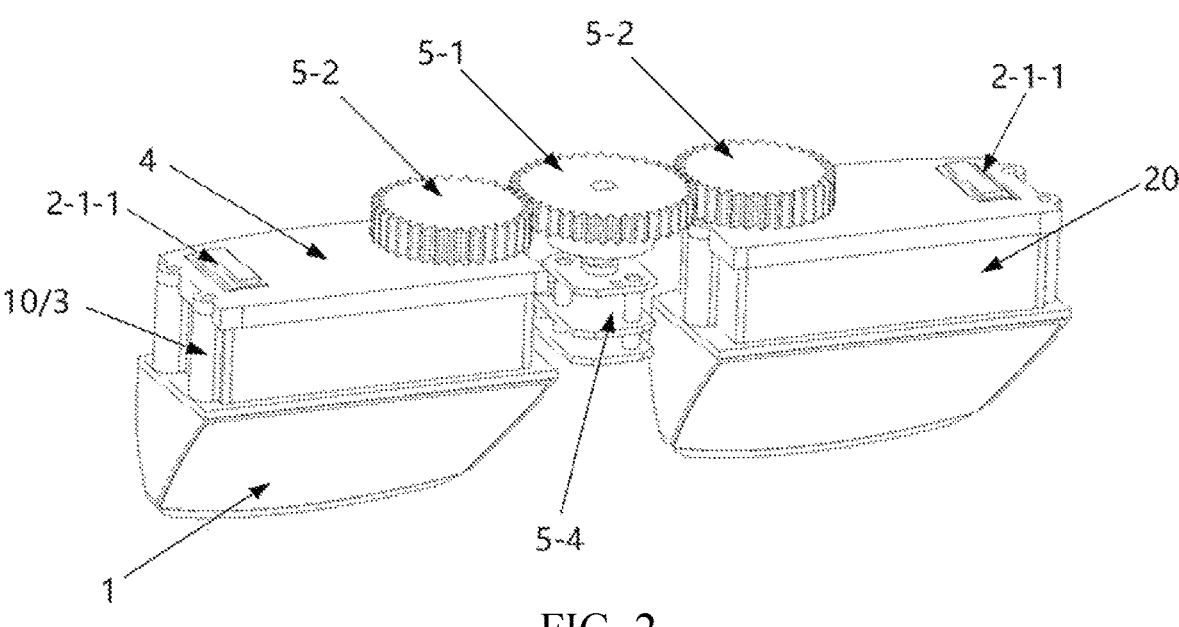
FIG. 2 is a schematic diagram of a three-dimensional structure of the head-mounted display device of FIG. 1.
Figures 3, 4:
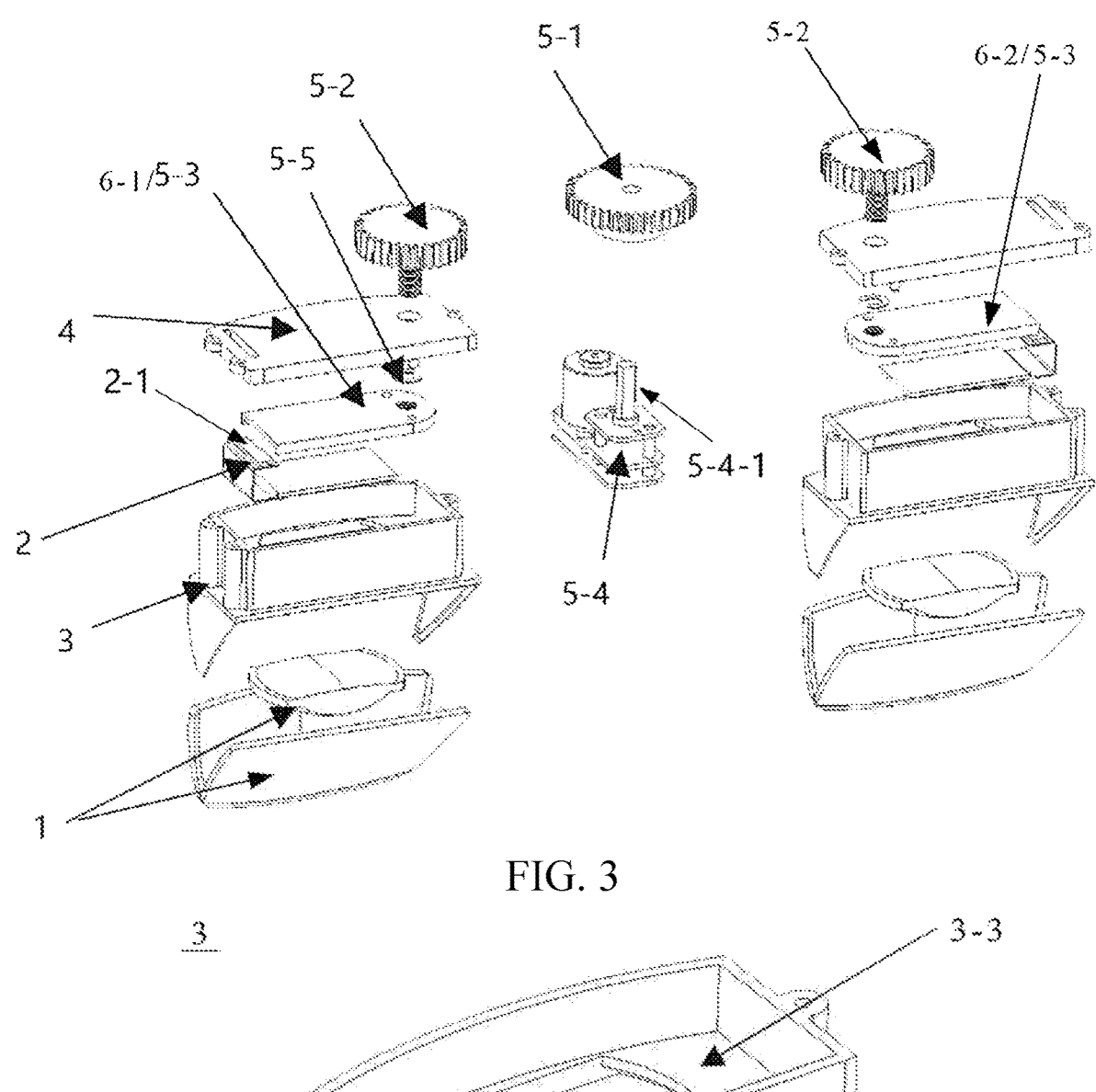
FIG. 3 is a schematic diagram of an explosive structure of the head-mounted display device of FIG. 1.
FIG. 4 is a schematic diagram of a structure of a barrel body of a lens barrel of the head-mounted display device of FIG. 1.

An embodiment of the present disclosure provides a head-mounted display device, in some exemplary embodiments, as shown in FIG. 1 to FIG. 3, FIG. 1 is schematic view of a cross-sectional structure of a head-mounted display device according to some exemplary embodiments, FIG. 2 is a schematic diagram of a three-dimensional structure of the head-mounted display device of FIG. 1, and FIG. 3 is a schematic diagram of an explosive structure of the head-mounted display device of FIG. 1. The head-mounted display device includes a holder, a lens barrel assembly provided on the holder (for example, the lens barrel assembly includes a first lens barrel assembly 10 and a second lens barrel assembly 20), and an adjusting device. The lens barrel assembly includes a lens barrel, a display module 2 provided in the lens barrel and an optical lens group provided at one end of the lens barrel. The optical lens group includes at least one optical lens 1, the adjusting device includes a driving device 5-4 provided on the holder, a support 5-3 provided in the lens barrel and fixedly connected with the display module 2, and a transmission device. The transmission device is configured to be capable of driving the support 5-3 to perform a reciprocating linear motion when driven by the driving device 5-4, so that the display module 2 is close to or away from the optical lens group.

The head-mounted display device of the embodiment of the present disclosure can make the display module 2 of the lens barrel assembly close to or away from the optical lens group by the adjusting device provided, so that a distance between the display module 2 and the optical lens group (i.e., the object distance) can be adjusted. In this way, the head-mounted display device can be suitable for users with different degrees of myopia, so that users with different degrees of myopia can clearly see images presented by the display module 2. The head-mounted display device of the embodiment of the present disclosure can be AR/VR glasses and the like.

Figures 5, 6, 7:
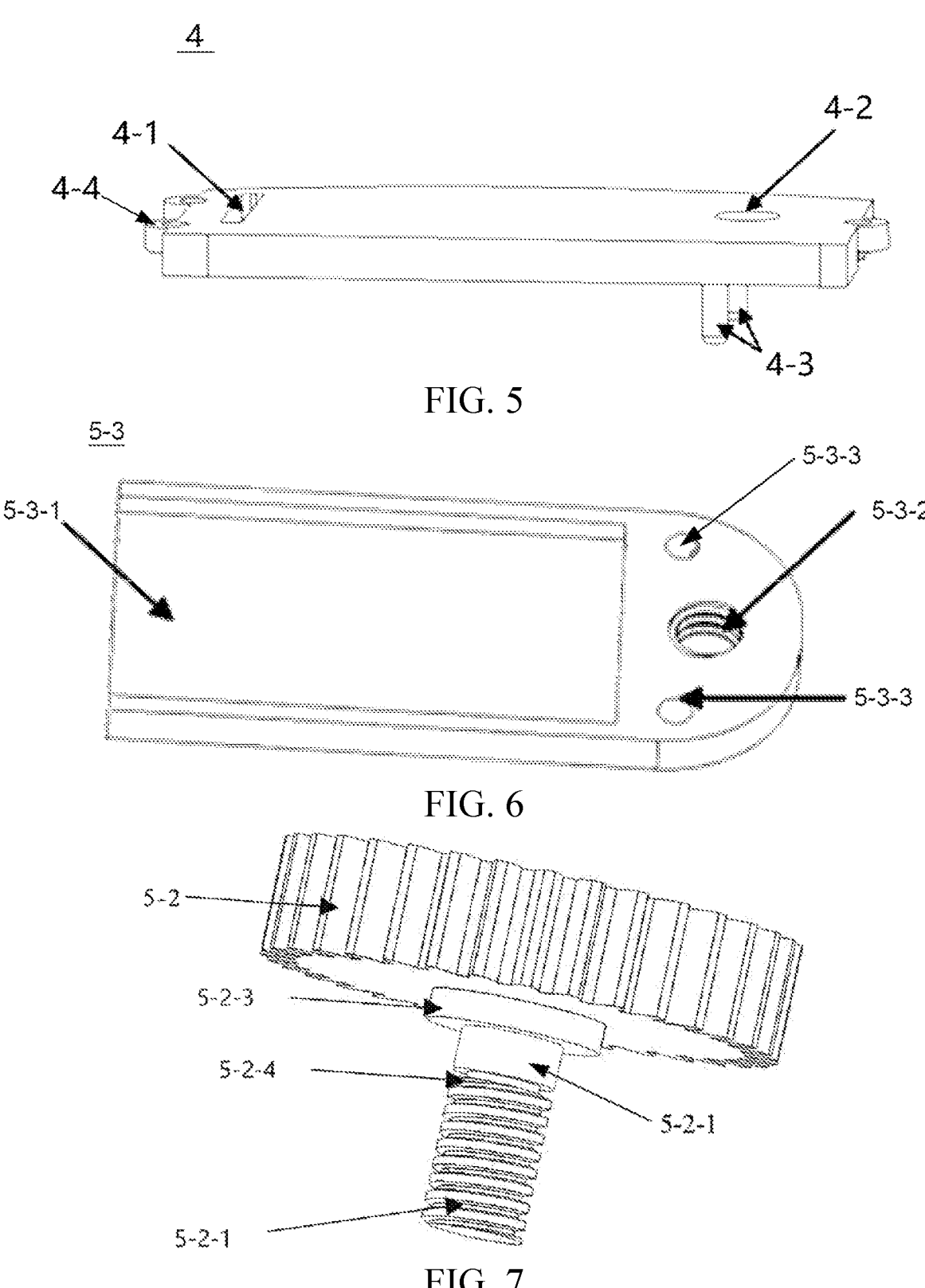
FIG. 5 is a schematic diagram of a structure of a cover plate of a lens barrel of the head-mounted display device of FIG. 1.
FIG. 6 is a schematic diagram of a structure of a support of the head-mounted display device of FIG. 1.
FIG. 7 is a schematic diagram of a structure of a second gear and a gear shaft of the head-mounted display device of FIG. 1.

In some exemplary embodiments, as shown in FIG. 1 to FIG. 3, FIG. 6 and FIG. 7, FIG. 6 is a schematic diagram of a structure of a support of the head-mounted display device of FIG. 1, and FIG. 7 is a schematic diagram of a structure of a second gear and a gear shaft of the head-mounted display device of FIG. 1. The transmission device may include a first gear 5-1 fixedly connected to a rotation output shaft 5-4-1 of the driving device 5-4 and a second gear 5-2 meshed with the first gear 5-1. A gear shaft 5-2-1 (as shown in FIG. 7) of the second gear 5-2 is mounted in a rotatable manner on the lens barrel and extends into the lens barrel, and the gear shaft 5-2-1 of the second gear 5-2 may include a threaded part 5-2-2. The threaded part 5-2-2 is in threaded connection with thread holes 5-3-2 (as shown in FIG. 6) provided on the support 5-3. The lens barrel is provided with a first guiding part, and the support 5-3 is also provided with a first sliding part which is sliding fit with the first guiding part. Thus, the first gear 5-1 rotates under a driving action of the driving device 5-4, the first gear 5-1 drives the second gear 5-2 to rotate, and the second gear 5-2 drives the support 5-3 to move linearly through the threaded part 5-2-2 of the gear shaft 5-2-1. Exemplarily, when the rotation output shaft 5-4-1 of the driving device 5-4 rotates forward, the support 5-3 can be driven to move linearly along a first direction, and when the rotation output shaft 5-4-1 of the driving device 5-4 rotates backward, the support 5-3 can be driven to move linearly in an opposite direction of the first direction, so that the reciprocating linear motion of the support member 5-3 can be realized, then the display module 2 can be moved close to or away from the optical lens group, and the distance between the display module 2 and the optical lens group can be adjusted.

In some exemplary embodiments, as shown in FIG. 1 to FIG. 3, the rotation output shaft 5-4-1 of the driving device 5-4 and the gear shaft 5-2-1 of the second gear 5-2 may be arranged in parallel. Exemplarily, the rotation output shaft 5-4-1 of the driving device 5-4 and the gear shaft 5-2-1 of the second gear 5-2 may both be arranged along the first direction. The driving device 5-4 may be a motor, such as a stepping motor or a servo motor, etc.

In some exemplary embodiments, the first guiding part may include a guiding post 4-3 provided on the lens barrel, and the first sliding part may include a guiding hole 5-3-3 that slides and fits with the guiding post 4-3. Exemplarily, as shown in FIG. 1 and FIG. 3, the lens barrel may include a barrel body 3 and a cover plate 4 provided at a first end 3-1 of the barrel body 3, and the optical lens group may be provided at a second end 3-2 of the barrel body 3. As shown in FIG. 5 and FIG. 6, FIG. 5 is a schematic diagram of a structure of a cover plate of a lens barrel of the head-mounted display device of FIG. 1. One or more (two in this example) guiding post(s) 4-3 may be provided on an inner side surface of the cover plate 4, the guiding posts 4-3 may be disposed in parallel with the gear shaft 5-2-1 of the second gear 5-2, and the support 5-3 may be provided with a guiding hole 5-3-3 which is sliding fit with the guiding posts 4-3.

In some exemplary embodiments, as shown in FIG. 1 to FIG. 3, the lens barrel assembly includes a first lens barrel assembly 10 and a second lens barrel assembly 20, and the support 5-3 includes a first support 6-1 provided in a lens barrel of the first lens barrel assembly 10 and a second support 6-2 provided in a lens barrel of the second lens barrel assembly 20. Two second gears 5-2 are provided, one of the two second gears 5-2 is connected with the first support 6-1, and another second gear 5-2 is connected with the second support 6-2. Exemplarily, gear shafts 5-2-1 of the two second gears 5-2 and the rotation output shaft 5-4-1 of the driving device 5-4 may be provided in parallel with each other. Both the two second gears 5-2 are meshed with the first gear 5-1 and are respectively positioned on two sides of the first gear 5-1. In this embodiment, the first gear 5-1 rotates under the driving action of the driving device 5-4, the first gear 5-1 drives the two second gears 5-2 to rotate, and the two second gears 5-2 respectively drive the first support 6-1 and the second support 6-2 to move linearly, thereby adjusting the distance between the display module 2 and the optical lens group in each of the first lens barrel assembly 10 and the second lens barrel assembly 20.

In some exemplary embodiments, the lens barrel may be provided with a first limiting part and a second limiting part. The first limiting part is configured to abut the support when the support moves to a limit position along the first direction, and the second limiting part is configured to abut the support when the support moves to a limit position along a direction opposite to the first direction.

In an example of this embodiment, as shown in FIG. 2, FIG. 4 and FIG. 5, FIG. 4 is a schematic diagram of a structure of a barrel body of a lens barrel of the head-mounted display device of FIG. 1, and FIG. 5 is a schematic diagram of a structure of a cover plate of a lens barrel of the head-mounted display device of FIG. 1. The lens barrel includes a barrel body 3 and a cover plate 4 provided at a first end 3-1 of the barrel body 3, and the optical lens group is provided at a second end 3-2 of the barrel body 3. At least one (three in this example) fixing posts 3-4 may be provided on an outer wall of the barrel body 3, and the cover plate 4 may be provided with at least one fixing hole 4-4, and the at least one fixing post 3-4 and the at least one fixing hole 4-4 may be connected to each other by a screw to connect the cover plate 4 with the barrel body 3. The cover plate 4 may be the first limiting part, and the second limiting part may be a baffle plate 3-3 provided on an inner wall of the barrel body 3. In another implementation mode, the first limiting part and the second limiting part may be a stop block provided on an inner wall of the lens barrel or other structures.

In some exemplary embodiments, as shown in FIG. 1, the display module 2 and the support 5-3 may be provided on a side of the baffle plate 3-3 facing the cover plate 4, and the optical lens group may be provided on a side of the baffle 3-3 plate facing away from the cover plate 4. As shown in FIG. 6, the support 5-3 may include a plate-shaped body, and a fixing groove 5-3-1 may be provided at a side (for example, a side facing the baffle plate 3-3) of the plate-shaped body, the display module 2 is fixed (e.g. bonded) within the fixing groove 5-3-1, and a display side of the display module 2 faces the optical lens group. The display module 2 may include a display panel and a flexible circuit board 2-1 connected with the display panel. A first end of the flexible circuit board 2-1 is connected with the display panel, a second end of the flexible circuit board 2-1 can be bent toward a side where the cover plate 4 is located, protrude from a via 4-1 (as shown in FIG. 5) provided on the cover plate 4 and then be attached to an outer surface of the cover plate 4, and multiple terminals 2-1-1 are provided at the second end of the flexible circuit board 2-1 and are configured to be connected with an external signal device to drive the display panel to display. After the second end of the flexible circuit board 2-1 protrudes from the via 4-1 on the cover plate 4 and the via 4-1 can be sealed with an adhesive tape and a graphite sheets, and the like. A length of the flexible circuit board 2-1 can be designed according to a movement range of the support 5-3 to ensure that needs of the movement are met.

In some exemplary embodiments, as shown in FIG. 1, FIG. 5 and FIG. 7, the gear shaft 5-2-1 of the second gear 5-2 is further provided with a limiting boss 5-2-3 and a limiting groove 5-2-4. The gear shaft 5-2-1 of the second gear 5-2 passes through a shaft hole 4-2 (as shown in FIG. 5) on the cover plate 4 and rotates in cooperation with the shaft hole 4-2. The limiting boss 5-2-3 abuts an outer side surface of the cover plate 4 and a snap spring 5-5 (as shown in FIG. 3) is provided within the limiting groove 5-2-4. The snap spring 5-5 may abut the inner surface of the cover plate 4, so that the gear shaft 5-2-1 of the second gear 5-2 is connected with the cover plate 4.

In some exemplary embodiments, as shown in FIG. 1 to FIG. 3, the lens barrel may include a barrel body 3 and a cover plate 4 provided at a first end 3-1 of the barrel body 3, the optical lens group is provided at a second end 3-2 of the barrel body. The optical lens group may include one or more optical lens(es) 1, and exemplarily, the optical lens group includes three optical lenses 1. One of the optical lenses 1 is provided within the barrel body 3 and is provided close to the second end 3-2 of the barrel body 3 with respect to the display module 2, and the other two optical lenses 1 are provided at the second end 3-2 of the barrel body 3 and may be V-shaped. In some other implementation modes, the optical lens group may include another number of optical lenses 1, and an arrangement mode of the multiple optical lenses 1 and a combination mode of the optical lenses 1 may be set according to requirements of optical path design.

Figure 8:
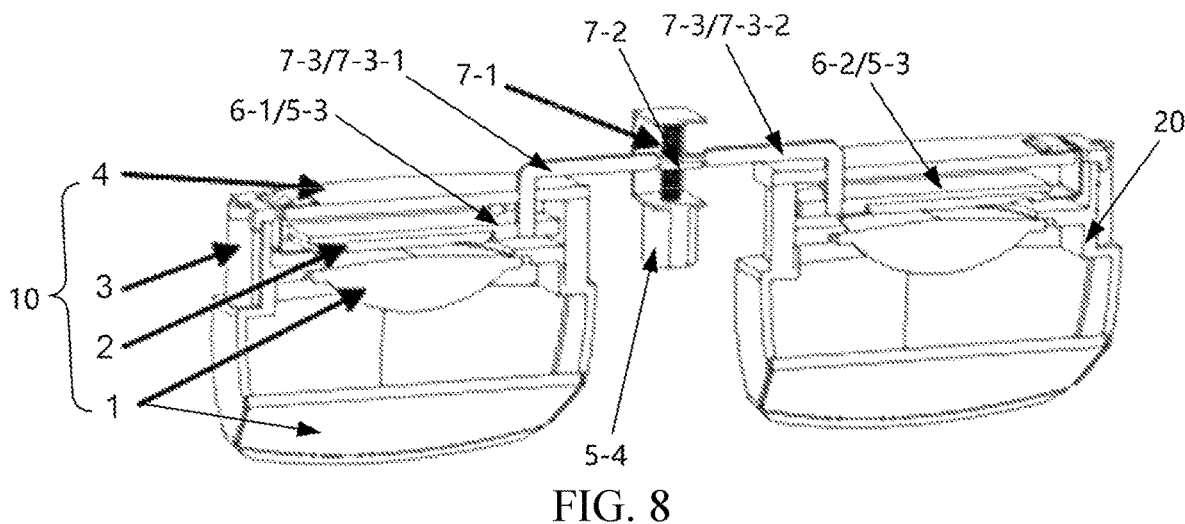
FIG. 8 is schematic view of a cross-sectional structure of a head-mounted display device according to some other exemplary embodiments.
Figure 9:
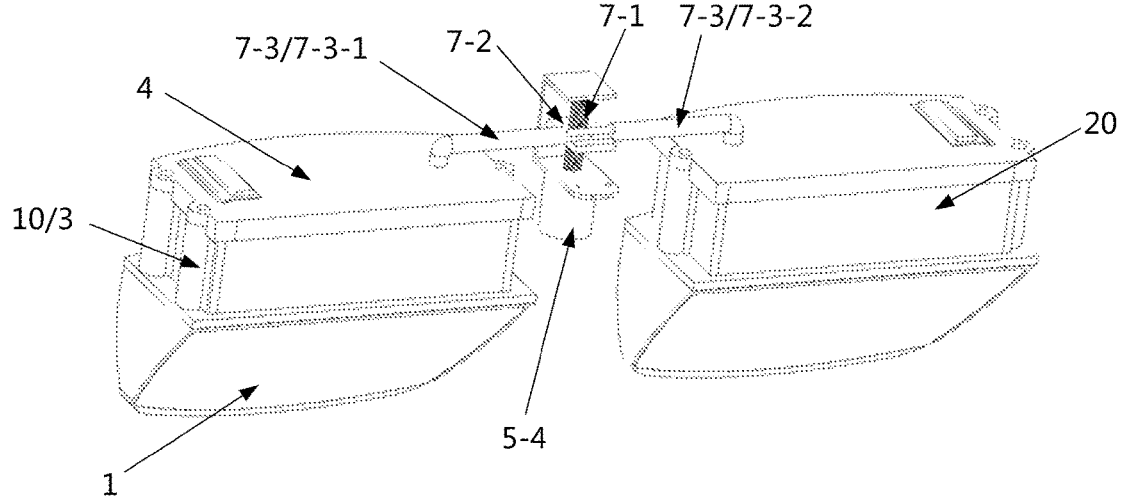
FIG. 9 is a schematic diagram of a three-dimensional structure of the head-mounted display device of FIG. 8.
Figure 10:
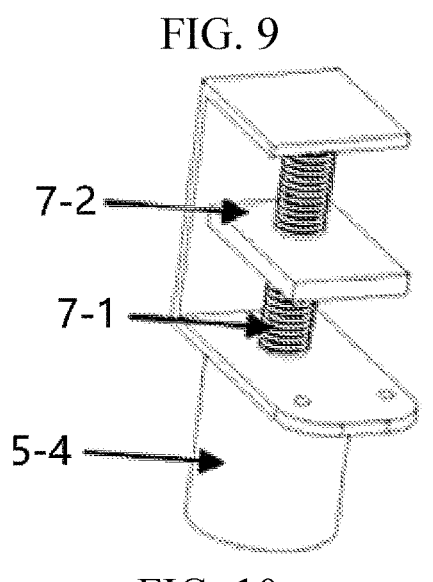
FIG. 10 is a schematic diagram of an assembly structure of a lead screw, a nut and a driving device of the head-mounted display device of FIG. 8.

In some other exemplary embodiments, as shown in FIG. 8 to FIG. 10, FIG. 8 is schematic view of a cross-sectional structure of a head-mounted display device according to some other exemplary embodiments, FIG. 9 is a schematic diagram of a three-dimensional structure of the head-mounted display device of FIG. 8, and FIG. 10 is a schematic diagram of an assembly structure of a lead screw, a nut and a driving device of the head-mounted display device of FIG. 8. The head-mounted display device includes a holder, a lens barrel assembly provided on the holder (exemplarily, the lens barrel assembly includes a first lens barrel assembly 10 and a second lens barrel assembly 20), and an adjusting device. The lens barrel assembly includes a lens barrel, a display module 2 provided within the lens barrel and an optical lens group provided at one end of the lens barrel. The optical lens group includes at least one optical lens 1. The adjusting device includes a driving device 5-4 provided on the holder, a support 5-3 provided within the lens barrel and fixedly connected with the display module 2, and a transmission device. The transmission device is configured to be capable of driving the support 5-3 to perform a reciprocating linear motion when driven by the driving device 5-4, so that the display module 2 is moved close to or away from the optical lens group.

In some exemplary embodiments, as shown in FIG. 8 to FIG. 10, the transmission device may include a lead screw 7-1 rotatably provided on the holder, a nut 7-2 in threaded connection with the lead screw 7-1, and a connection rod 7-3 fixedly connected to the nut 7-2. The lead screw 7-1 is fixedly connected with a rotation output shaft 5-4-1 of the driving device 5-4, and one end of the connection rod 7-3 extends into the lens barrel and is fixedly connected with the support 5-3. In this embodiment, the lead screw 7-1 rotates under a driving action of the driving device 5-4, and when the lead screw 7-1 rotates, the support 5-3 is driven to move linearly in a direction parallel to the lead screw 7-1 through the nut 7-2 and the connection rod 7-3. Exemplarily, when the rotation output shaft 5-4-1 of the driving device 5-4 rotates forward, the support 5-3 can be driven to move linearly along the first direction, and when the rotation output shaft 5-4-1 of the driving device 5-4 rotates backward, the support 5-3 can be driven to move linearly along a direction opposite to the first direction, so that the reciprocating linear motion of the support 5-3 can be realized, so that the display module 2 can be moved close to or away from the optical lens group, and a distance between the display module 2 and the optical lens group can be adjusted.

In some exemplary embodiments, the holder may further be provided with a second guiding part, and the nut may be provided with a second sliding part which is sliding fit with the second guide part. Or, the lens barrel is provided with a second guiding part, and the support is provided with a second sliding part which is sliding fit with the second guiding part. Exemplarily, the second guiding part may be a guiding post 4-3 provided parallel to the lead screw, and the second sliding part may be a guiding hole 5-3-3 that is sliding fit with the guiding post 4-3.

In some exemplary embodiments, as shown in FIG. 8 and FIG. 9, the lens barrel assembly may include a first lens barrel assembly 10 and a second lens barrel assembly 20, and the support 5-3 includes a first support 6-1 provided within a lens barrel of the first lens barrel assembly 10 and a second support 6-2 provided within a lens barrel of the second lens barrel assembly 20. The connection rod 7-3 may include a first connection rod 7-3-1 and a second connection rod 7-3-2. Two ends of the first connection rod 7-3-1 are fixedly connected with the nut 7-2 and the first support 6-1 respectively, and two ends of the second connection rod 7-3-2 are fixedly connected with the nut 7-2 and the second support 6-2 respectively. Exemplarily, the first connection rod 7-3-1 and the second connection rod 7-3-2 may both be L-shaped. Taking the first connection rod 7-3-1 as an example, one end of the first connection rod 7-3-1 may be fixed to the nut 7-2 by a screw, and the other end of the first connection rod may be inserted and fixed in a connection hole provided in the first support 6-1. In this embodiment, the lead screw 7-1 rotates under the driving action of the driving device 5-4, and when the lead screw 7-1 rotates, the first support 6-1 is driven to move linearly in a direction parallel to the lead screw 7-1 by the nut 7-2 and the first connection rod 7-3-1, and the second support 6-2 is driven to move linearly in a direction parallel to the lead screw 7-1 by the nut 7-2 and the second connection rod 7-3-2, so that the distance between the display module 2 and the optical lens group each of within the first lens barrel assembly 10 and the second lens barrel assembly 20 can be adjusted. In this way, the head-mounted display device can be suitable for users with different degrees of myopia, so that users with different degrees of myopia can clearly see images presented by the display module 2.

In the accompanying drawings, a size of a constituent element, and a thickness of a layer or an area are sometimes exaggerated for clarity. Therefore, an implementation mode of the present disclosure is not necessarily limited to the size, and shape and size of each component in the drawings do not reflect an actual scale. In addition, the drawings schematically illustrate some examples, and an implementation mode of the present disclosure is not limited to the shapes or numerical values shown in the drawings.

In the description herein, "parallel" refers to a state in which an angle formed by two straight lines is above −10° and below 10°, and thus also includes a state in which the angle is above −5° and below 5°. In addition, "vertical" refers to a state in which an angle formed by two straight lines is above 80° and below 100°, and thus also includes a state in which the angle is above 85° and below 95°.

In the description herein, orientation or position relationships indicated by terms such as "upper", "lower", "left", "right", "top", "inside", "outside", "axial", "tetragonal" and the like are orientation or position relationships shown in the drawings, and are intended to facilitate description of the embodiments of the present disclosure and simplification of the description, but not to indicate or imply that the referred structure has a specific orientation or be constructed and operated in a specific orientation, therefore, they should not be understood as limitations on the present disclosure.

In the description herein, unless otherwise specified and defined explicitly, terms "connection", "fixed connection", "installation" and "assembly" should be understood in a broad sense, and, for example, a connection may be a fixed connection, a detachable connection or an integrated connection. Terms "installation", "connection" and "fixed connection" may be a direct connection, an indirect connection through intermediate components, or an inner communication between two components. For those ordinarily skilled in the art, meanings of the above terms in the embodiments of the present disclosure may be understood according to situations.

The invention claimed is:

1. A head-mounted display device, comprising a holder, a lens barrel assembly provided on the holder, and an adjusting device;

wherein the lens barrel assembly comprises a lens barrel, a display module provided in the lens barrel and an optical lens group provided at one end of the lens barrel, the optical lens group comprises at least one optical lens;

the adjusting device comprises a driving device provided on the holder, a support provided in the lens barrel and fixedly connected with the display module, and a transmission device, the driving device drives the transmission device to move to drive the support to perform a reciprocating linear motion, so that the display module is moved close to or away from the optical lens group; and wherein the transmission device comprises a first gear fixedly connected with a rotation output shaft of the driving device and a second gear meshed with the first gear;

wherein a gear shaft of the second gear is rotatably mounted on the lens barrel and extends into the lens barrel, the gear shaft of the second gear comprises a threaded part, and the threaded part is in threaded connection with a threaded hole provided on the support; and the lens barrel is provided with a first guiding part, and the support is further provided with a first sliding part which is sliding fit with the first guiding part.

2. The head-mounted display device according to claim 1, wherein the first guiding part comprises a guiding post provided on the lens barrel, and the first sliding part comprises a guiding hole which is sliding fit with the guiding post.

3. The head-mounted display device according to claim 1 wherein the rotation output shaft of the driving device is provided parallel to the gear shaft of the second gear.

4. The head-mounted display device according to claim 1, wherein the lens barrel assembly comprises a first lens barrel assembly and a second lens barrel assembly, and the support comprises a first support provided in a lens barrel of the first lens barrel assembly and a second support provided in a lens barrel of the second lens barrel assembly;

two second gears are provided, one of the two second gears is connected with the first support, and another second gear is connected with the second support.

5. The head-mounted display device according to claim 1, wherein the lens barrel is provided with a first limiting part and a second limiting part, the first limiting part is configured to abut the support when the support moves to a limit position in a first direction, and the second limiting part is configured to abut the support when the support moves to a limit position in a direction opposite to the first direction.

6. The head-mounted display device according to claim 5, wherein the lens barrel comprises a barrel body and a cover plate provided at a first end of the barrel body, the optical lens group is provided at a second end of the barrel body, the cover plate is the first limiting part, and the second limiting part is a baffle plate provided on an inner wall of the barrel body.

7. The head-mounted display device according to claim 6, wherein the display module and the support are provided on a side of the baffle plate facing the cover plate, and the optical lens group is provided on a side of the baffle plate facing away from the cover plate.

8. The head-mounted display device according to claim 1, wherein the rotation output shaft of the driving device and the gear shaft of the second gear are both arranged along a first direction.

9. The head-mounted display device according to claim 1, wherein the driving device is a stepping motor or a servo motor.

10. The head-mounted display device according to claim 6, wherein a plurality of guiding posts are provided on an inner side surface of the cover plate, the plurality of guiding posts are disposed in parallel with the gear shaft of the second gear.

11. The head-mounted display device according to claim 6, wherein at least one fixing post are provided on an outer wall of the barrel body, and the cover plate is provided with at least one fixing hole, and the at least one fixing post and the at least one fixing hole are connected to each other by one or more screws to connect the cover plate with the barrel body.

12. The head-mounted display device according to claim 5, wherein the first limiting part and the second limiting part may each be a stop block provided on an inner wall of the lens barrel.

13. The head-mounted display device according to claim 6, wherein the display module includes a display panel and a flexible circuit board connected with the display panel;

a first end of the flexible circuit board is connected with the display panel, a second end of the flexible circuit board is bent toward a side where the cover plate is located, protrude from a via provided on the cover plate and then be attached to an outer surface of the cover plate.

14. The head-mounted display device according to claim 13, wherein a plurality of terminals are provided at the second end of the flexible circuit board and are configured to be connected with an external signal device to drive the display panel to display.

15. The head-mounted display device according to claim 6, wherein the gear shaft of the second gear is further provided with a limiting boss and a limiting groove;

the gear shaft of the second gear passes through a shaft hole on the cover plate and rotates in cooperation with the shaft hole; the limiting boss abuts an outer side surface of the cover plate; and a snap spring is provided within the limiting groove, and the snap spring abuts an inner surface of the cover plate, so that the gear shaft of the second gear is connected with the cover plate.

16. A head-mounted display device, comprising a holder, a lens barrel assembly provided on the holder, and an adjusting device;

wherein the lens barrel assembly comprises a lens barrel, a display module provided in the lens barrel and an optical lens group provided at one end of the lens barrel, the optical lens group comprises at least one optical lens;

the adjusting device comprises a driving device provided on the holder, a support provided in the lens barrel and fixedly connected with the display module, and a transmission device, the driving device drives the transmission device to move to drive the support to perform a reciprocating linear motion, so that the display module is moved close to or away from the optical lens group; and wherein the transmission device comprises a lead screw rotatably provided on the holder, a nut in threaded connection with the lead screw, and a connection rod fixedly connected with the nut; and the lead screw is fixedly connected with a rotation output shaft of the driving device, and one end of the connection rod extends into the lens barrel and is fixedly connected with the support.

17. The head-mounted display device according to claim 16, wherein the holder is further provided with a second guiding part, and the nut is provided with a second sliding part which is sliding fit with the second guiding part; or

the lens barrel is provided with a second guiding part, and the support is provided with a second sliding part which is sliding fit with the second guiding part.

18. The head-mounted display device according to claim 16, wherein the lens barrel assembly comprises a first lens barrel assembly and a second lens barrel assembly, and the support comprises a first support provided in the lens barrel of the first lens barrel assembly and a second support provided in the lens barrel of the second lens barrel assembly; and the connection rod comprises a first connection rod and a second connection rod, two ends of the first connection rod are fixedly connected with the nut and the first support respectively, and the two ends of the second connection rod are fixedly connected with the nut and the second support respectively.

19. A head-mounted display device, comprising a holder, a lens barrel assembly provided on the holder, and an adjusting device;

wherein the lens barrel assembly comprises a lens barrel, a display module provided in the lens barrel and an optical lens group provided at one end of the lens barrel, the optical lens group comprises at least one optical lens;

the adjusting device comprises a driving device provided on the holder, a support provided in the lens barrel and fixedly connected with the display module, and a transmission device, the driving device drives the transmission device to move to drive the support to perform a reciprocating linear motion, so that the display module is moved close to or away from the optical lens group; and wherein the support comprises a plate-shaped body, a fixing groove is provided on a side of the plate-shaped body, and the display module is fixed in the fixing groove.

* * * * *